US008655055B2

United States Patent
Appia

(10) Patent No.: US 8,655,055 B2
(45) Date of Patent: Feb. 18, 2014

(54) METHOD, SYSTEM AND COMPUTER PROGRAM PRODUCT FOR CONVERTING A 2D IMAGE INTO A 3D IMAGE

(75) Inventor: Vikram Appia, Atlanta, GA (US)

(73) Assignee: Texas Instruments Incorporated, Dallas, TX (US)

( * ) Notice: Subject to any disclaimer, the term of this patent is extended or adjusted under 35 U.S.C. 154(b) by 50 days.

(21) Appl. No.: 13/451,025

(22) Filed: Apr. 19, 2012

(65) Prior Publication Data

US 2012/0281906 A1  Nov. 8, 2012

Related U.S. Application Data

(60) Provisional application No. 61/482,329, filed on May 4, 2011.

(51) Int. Cl.
*G06K 9/00* (2006.01)

(52) U.S. Cl.
USPC .......................................... 382/154

(58) Field of Classification Search
None
See application file for complete search history.

(56) References Cited

U.S. PATENT DOCUMENTS

| | | | | |
|---|---|---|---|---|
| 6,417,850 | B1 * | 7/2002 | Kang | 345/422 |
| 2006/0087556 | A1 * | 4/2006 | Era | 348/51 |
| 2008/0150945 | A1 * | 6/2008 | Wang et al. | 345/427 |
| 2010/0014781 | A1 * | 1/2010 | Liu et al. | 382/285 |
| 2010/0141651 | A1 * | 6/2010 | Tan | 345/420 |

OTHER PUBLICATIONS

Jaeseung Ko; Manbae Kim; Changick Kim, "2D-to-3D Stereoscopic Conversion: Depth-map Estimation in a 2D Single-view Image", (Sep. 24, 2007), Proc. SPIE, vol. 6696.*

* cited by examiner

*Primary Examiner* — Jason M Repko
*Assistant Examiner* — Carol Wang
(74) *Attorney, Agent, or Firm* — Michael A. Davis, Jr.; W. James Brady; Frederick J. Telecky, Jr.

(57) ABSTRACT

For converting a two-dimensional visual image into a three-dimensional visual image, the two-dimensional visual image is segmented into regions, including a first region having a first depth and a second region having a second depth. The first and second regions are separated by at least one boundary. A depth map is generated that assigns variable depths to pixels of the second region in response to respective distances of the pixels from the boundary, so that the variable depths approach the first depth as the respective distances decrease, and so that the variable depths approach the second depth as the respective distances increase. In response to the depth map, left and right views of the three-dimensional visual image are synthesized.

27 Claims, 13 Drawing Sheets

METHOD, SYSTEM AND COMPUTER PROGRAM PRODUCT FOR CONVERTING A 2D IMAGE INTO A 3D IMAGE

CROSS-REFERENCE TO RELATED APPLICATION

This application claims priority to U.S. Provisional Patent Application Ser. No. 61/482,329, filed May 4, 2011, entitled SYMMETRIC AND ASYMMETRIC WARPING FOR VIEW SYNTHESIS IN 2D TO 3D CONVERSION, naming Vikram Appia as inventor, which is hereby fully incorporated herein by reference for all purposes.

BACKGROUND

The disclosures herein relate in general to digital image processing, and in particular to a method, system and computer program product for converting a two-dimensional visual image ("2D image") into its corresponding three-dimensional visual image ("3D image").

For converting a 2D image into its corresponding 3D image, two different views (e.g., left view and right view) of the 3D image are created from a single view of the 2D image. Such conversion may introduce geometric distortions into the 3D image. Such geometric distortions can strain a human's viewing of the 3D image, thereby causing eventual discomfort (e.g., headaches and/or eye muscle pain). Such discomfort is a shortcoming, which discourages the human's viewing (e.g., with consumer products) of the 3D image that results from such conversion.

SUMMARY

For converting a two-dimensional visual image into a three-dimensional visual image, the two-dimensional visual image is segmented into regions, including a first region having a first depth and a second region having a second depth. The first and second regions are separated by at least one boundary. A depth map is generated that assigns variable depths to pixels of the second region in response to respective distances of the pixels from the boundary, so that the variable depths approach the first depth as the respective distances decrease, and so that the variable depths approach the second depth as the respective distances increase. In response to the depth map, left and right views of the three-dimensional visual image are synthesized.

DETAILED DESCRIPTION

Figure 1:
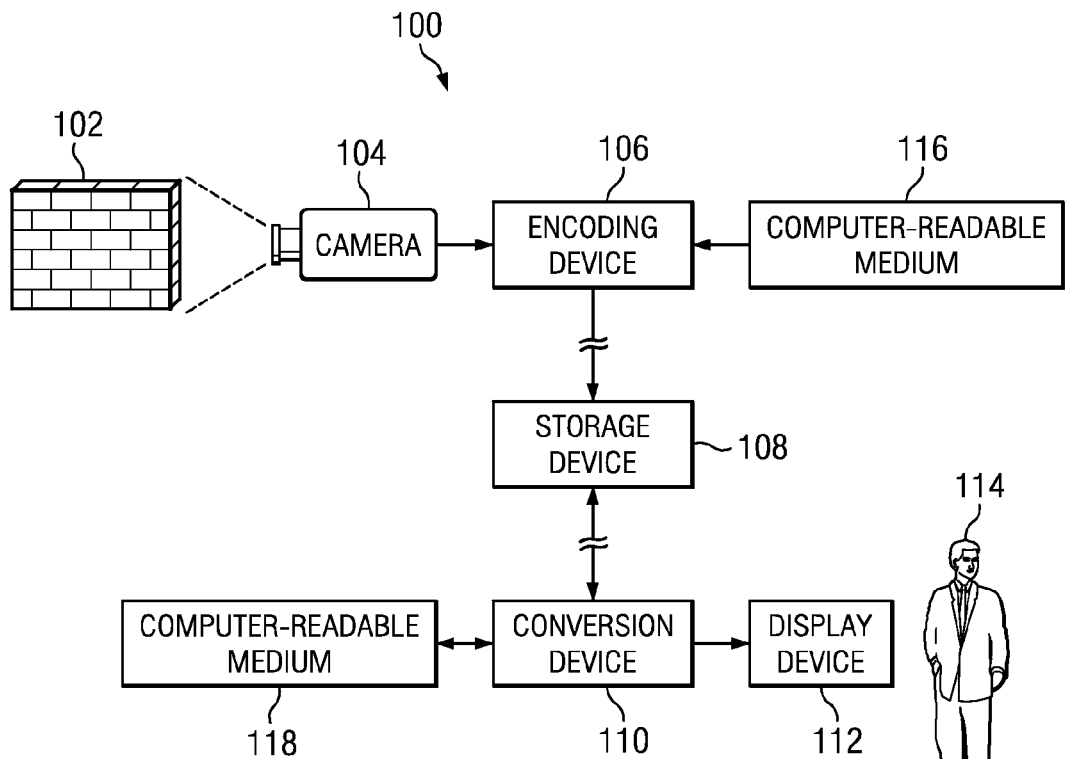
FIG. 1 is a block diagram of an information handling system of the illustrative embodiments.

FIG. 1 is a block diagram of an information handling system, indicated generally at 100, of the illustrative embodiments. In the example of FIG. 1, a physical object 102 and its surrounding foreground and background are viewed by a camera 104, which: (a) digitizes pictures of such views; and (b) outputs a video sequence of such digitized (or "digital") pictures to an encoding device 106. The encoding device 106: (a) receives the video sequence of such digitized pictures from the camera 104; (b) in response thereto, encodes the video sequence of such digitized pictures into a binary logic bit stream; and (c) outputs such bit stream to a storage device 108, which receives and stores such bit stream.

A conversion device 110: (a) reads such bit stream from the storage device 108; (b) in response thereto, decodes such bit stream into the video sequence of such digitized pictures; (c) converts the video sequence of such digitized pictures from 2D images into their corresponding 3D images; (d) writes the converted video sequence for storage into the storage device 108; and (e) outputs the converted video sequence to a display device 112 (e.g., substantially concurrent with such conversion by the conversion device 110 in real-time, or after the conversion device 110 subsequently reads the converted video sequence from the storage device 108 in response to a command from a user). The display device 112: (a) receives the converted video sequence from the conversion device 110; and (b) in response thereto, displays such 3D images (e.g., 3D images of the object 102 and its surrounding foreground and background), which are viewable by a human user 114.

In an alternative embodiment: (a) the encoding device 106 outputs such bit stream directly to the conversion device 110 via a communication channel (e.g., Ethernet, Internet, or wireless communication channel); and (b) accordingly, the conversion device 110 receives and processes such bit stream directly from the encoding device 106 in real-time. In such alternative embodiment, the storage device 108 either: (a) concurrently receives and stores such bit stream from the encoding device 106; or (b) is absent from the system 100.

The encoding device 106 performs its operations in response to instructions of a computer-readable program that is stored on a computer-readable medium 116 (e.g., hard disk drive, flash memory card, or other nonvolatile storage device). Similarly, the conversion device 110 performs its operations in response to instructions of a computer-readable program that is stored on a computer-readable medium 118. Also, the computer-readable medium 118 stores a training database of information for the conversion device 110 operations. The system 100 is formed by electronic circuitry components for performing the system 100 operations.

Figure 2:
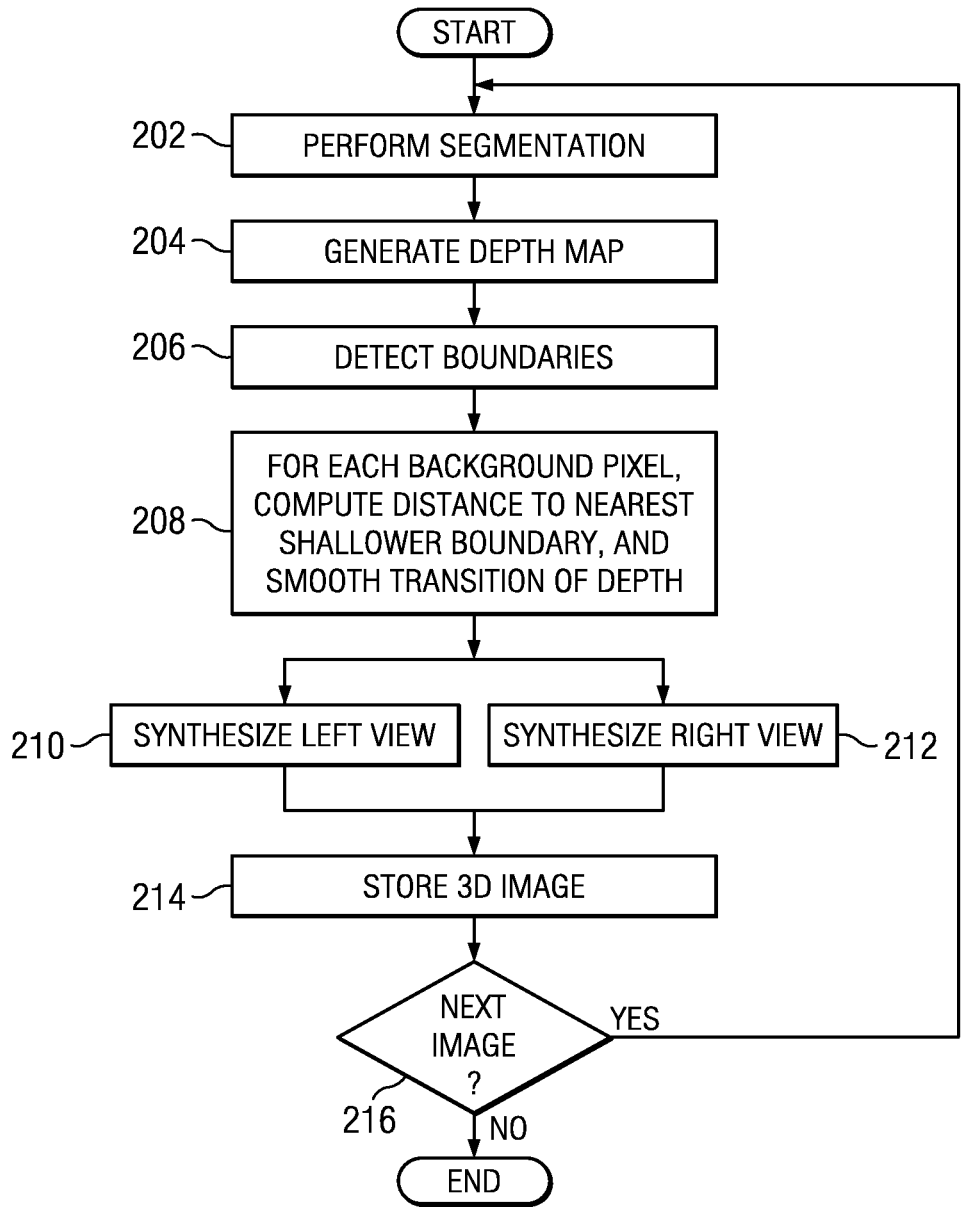
FIG. 2 is a flowchart of operations for converting a 2D image into its corresponding 3D image.
Figure 3:
FIG. 3 is an example 2D image.

FIG. 2 is a flowchart of the conversion device 110 operations for converting a 2D image into its corresponding 3D image. FIG. 3 is an example 2D image. Referring to FIG. 2, at a step 202, in response to the training database of information from the computer-readable medium 118, the conversion device 110: (a) detects and classifies various low level features (e.g., colors, edges, textures, focus/blur, object sizes, gradients, and positions) and high level features (e.g., faces, bodies, sky, foliage, and other objects) within the 2D image; and (b) performs a mean shift clustering operation to segment the 2D image into regions. At a next step 204, in response to such features, and in response to such information from the training database, the conversion device 110 generates a depth map that assigns suitable depth values to such regions within the 2D image.

Figure 4:
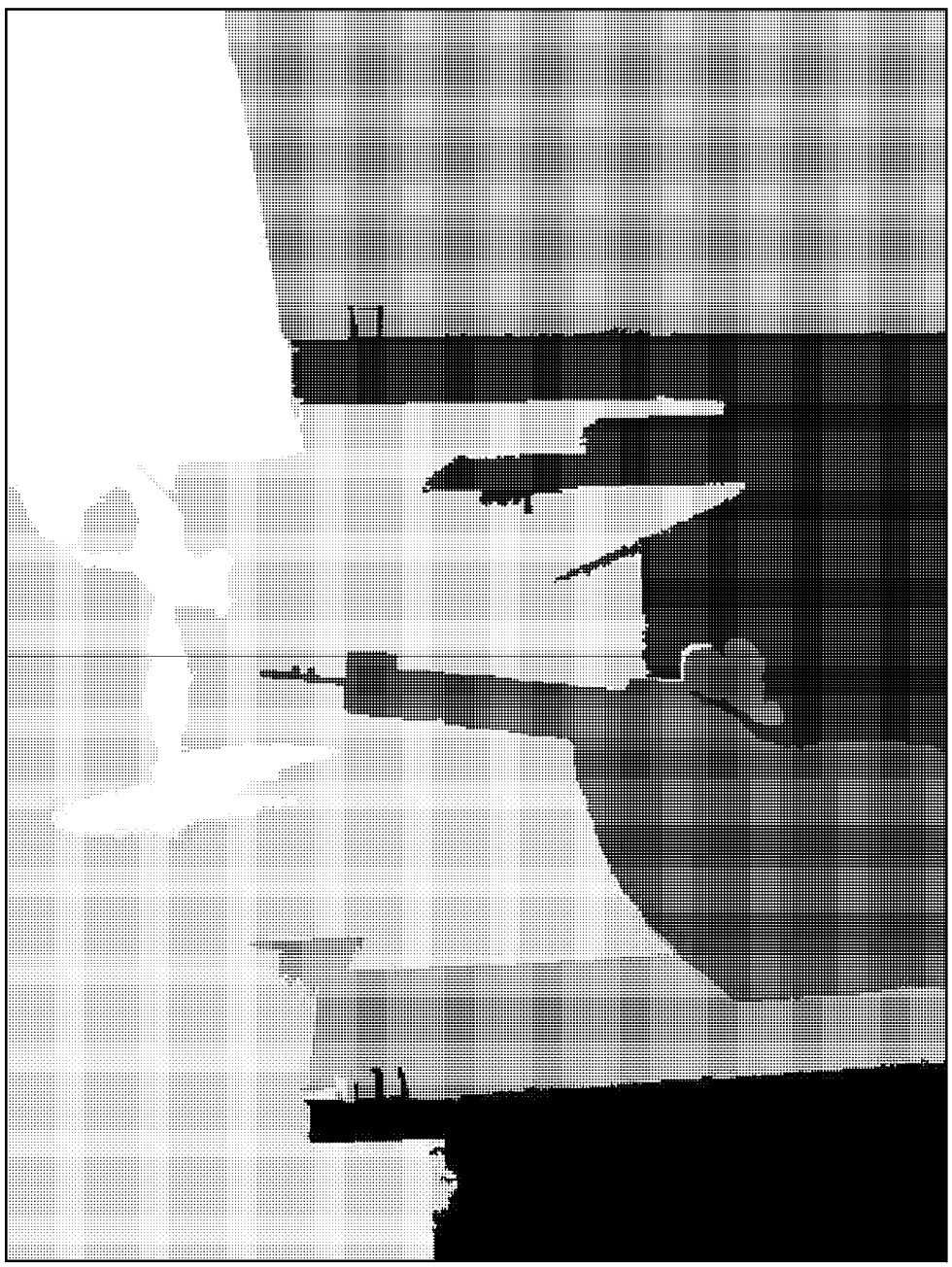
FIG. 4 is an example of a depth map for the 2D image of FIG. 3.

FIG. 4 shows an example of the depth map for the 2D image of FIG. 3. For example, within the 2D image: (a) one region ("foreground region") includes one or more features that were most proximate to the camera 104, so that all pixels within the foreground region ("foreground pixels") have a relative depth=0 in the depth map; and (b) by comparison, other regions ("background regions") include one or more features that were less proximate to (e.g., more distant from) the camera 104, so that all pixels within the background regions ("background pixels") have an initial depth>0 in the depth map. In the illustrative embodiment, the conversion device 110 assigns the initial depths in discrete tiers relative to the foreground region, so that all background pixels within the same background region have the same initial depth as one another in the depth map. Accordingly, in the example of FIG. 4, the conversion device 110 segments the 2D image into a foreground region and five (5) background regions ("6-region example"), so that: (a) the foreground region has a relative depth=0 in the depth map; and (b) the five (5) background regions have relative depths of 0.2, 0.4, 0.6, 0.8 and 1.0, respectively, in the depth map. Referring again to FIG. 2, in response to the depth map, the conversion device 110 detects boundaries between such regions at a next step 206 (after the step 204).

Figure 5:
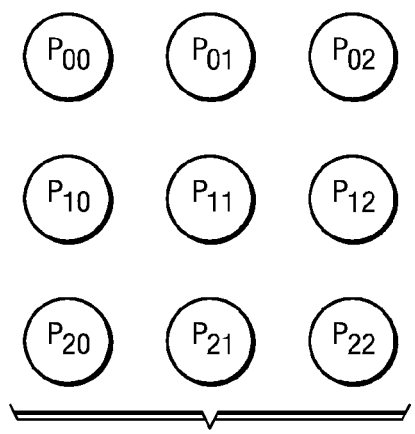
FIG. 5 is a diagram of a representative pixel that has eight (8) neighboring pixels.

FIG. 5 is a diagram of a representative pixel $P_{11}$, which has eight (8) neighboring pixels $P_{00}$, $P_{01}$, $P_{02}$, $P_{10}$, $P_{12}$, $P_{20}$, $P_{21}$ and $P_{22}$ (collectively "neighboring pixels"). Accordingly, each pixel $P_{xy}$ is located within a row X and within a column Y of the 2D image, so that such pixel $P_{xy}$ has an X-Y coordinate location within the 2D image. If the depth map indicates that all of the neighboring pixels have a depth that is equal to a depth of the pixel $P_{11}$, then the conversion device 110 determines that the pixel $P_{11}$ is not located alongside a boundary between two of such regions. By comparison, if the depth map indicates that at least one neighboring pixel has a depth that is different from the depth of the pixel $P_{11}$, then the conversion device 110 determines that: (a) the pixel $P_{11}$ is a boundary pixel located alongside a boundary between two of such regions; (b) other boundary pixel(s) include such neighboring pixel(s) whose depth is different from the depth of the pixel $P_{11}$; and (c) such boundary exists between the boundary pixel $P_{11}$ and such other boundary pixel(s).

Figure 6:
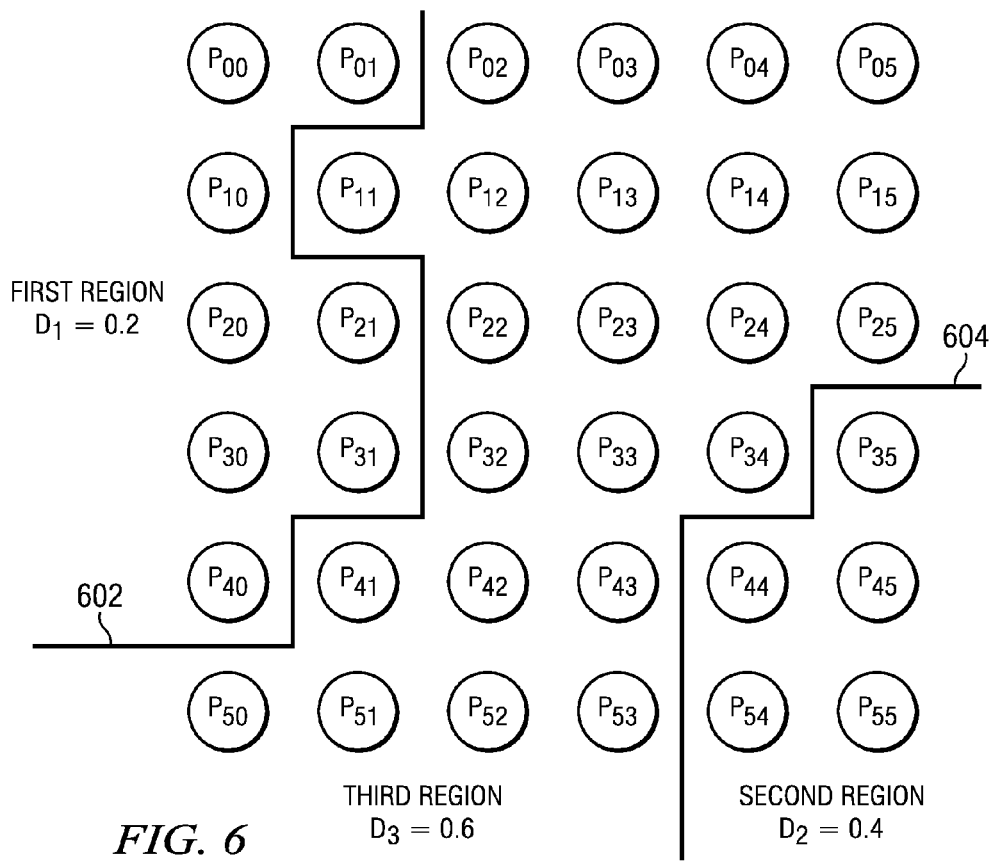
FIG. 6 is a diagram of an example of two boundaries, which separate different regions within a 2D image.

FIG. 6 shows an example of two boundaries 602 and 604, which separate different regions within the 2D image. In such example: (a) a first region includes pixels $P_{00}$, $P_{01}$, $P_{10}$, $P_{20}$, $P_{21}$, $P_{30}$, $P_{31}$ and $P_{40}$, which have the same initial depth ($D_1$=0.2) as one another in the depth map, so that $D_1$ is the first region's relative depth; (b) a second region includes pixels $P_{35}$, $P_{44}$, $P_{45}$, $P_{54}$ and $P_{55}$, which have the same initial depth ($D_2$=0.4) as one another in the depth map, so that $D_2$ is the second region's relative depth; and (c) a third region includes the remaining pixels of FIG. 6, which have the same initial depth ($D_3$=0.6) as one another in the depth map, so that $D_3$ is the third region's relative depth. The boundary 602 separates the first and third regions. The boundary 604 separates the second and third regions. Accordingly: (a) the first region is shallower than the second and third regions; (b) the first and second regions are shallower than the third region; (c) the third region is deeper than the first and second regions; and (d) relative to pixels within the third region, the boundaries 602 and 604 separate the third region from shallower regions.

Referring again to FIG. 2, in a first embodiment, at a next step 208, for each background pixel $P_{xy}$, the conversion device 110 computes a respective distance $N_{xy}$ from the pixel $P_{xy}$ to its nearest boundary pixel ("$P_{xy}$'s nearest boundary pixel") that is located within a shallower region ("$P_{xy}$'s nearest shallower region"), so that the pixel $P_{xy}$'s nearest shallower region is shallower than the pixel $P_{xy}$'s own region. In one embodiment, the respective distance $N_{xy}$ is a straight-line (e.g., Euclidean) distance, measured as a number of pixels, that would be traversed along a shortest route from the pixel $P_{xy}$ to its nearest boundary pixel.

In the example of FIG. 6, the pixel $P_{03}$ is: (a) two pixels (e.g., $P_{02}$ and $P_{01}$) away from its nearest boundary pixel $P_{01}$, so that the pixel $P_{03}$'s respective distance $N_{03}$=2, and so that the first region is the pixel $P_{03}$'s nearest shallower region; and (b) ~3.61 pixels (e.g., $\sqrt{[2^2+3^2]}$) away from the boundary pixel $P_{35}$. By comparison, the pixel $P_{14}$ is: (a) ~3.16 pixels (e.g., $\sqrt{[3^2+1^2]}$) away from the boundary pixel $P_{01}$; and (b) ~2.24 pixels (e.g., $\sqrt{[1^2+2^2]}$) away from its nearest boundary pixel $P_{35}$, so that the pixel $P_{14}$'s respective distance $N_{14}$=~2.24, and so that the second region is the pixel $P_{14}$'s nearest shallower region. Similarly, the pixel $P_{32}$ is one pixel (e.g., $P_{31}$) away from its nearest boundary pixel $P_{31}$, so that the pixel $P_{32}$'s respective distance $N_{32}$=1, and so that the first region is the pixel $P_{32}$'s nearest shallower region.

Figure 7:
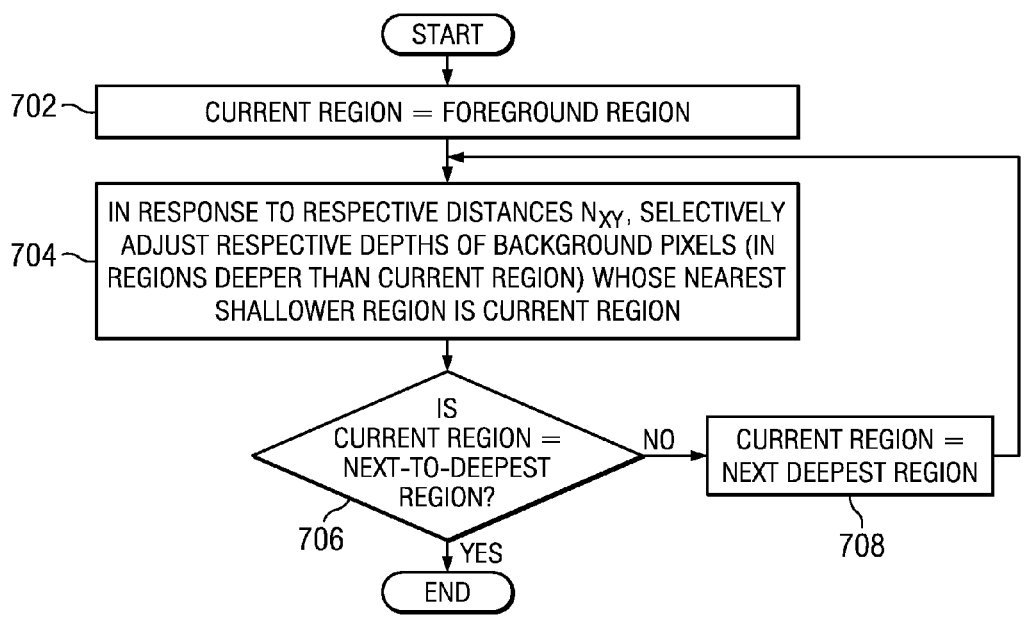
FIG. 7 is a flowchart of depth transition smoothing operations.

FIG. 7 is a flowchart of depth transition smoothing operations of the conversion device 110, which are performed by the conversion device 110 at the step 208 of FIG. 2. Referring to FIG. 7, at a step 702, the conversion device 110 starts the depth transition smoothing operations by designating the foreground region as a current region.

In the first embodiment, at a next step 704, in response to the respective distances $N_{xy}$, the conversion device 110 selectively adjusts respective depths (in the depth map) of background pixels (in regions deeper than the current region) whose nearest shallower region is the current region. For such adjustment of a pixel $P_{xy}$'s respective depth $D_{xy}$ in the depth map, the conversion device 110 computes a transition amount $T_{xy}=K \cdot N_{xy}$ (where K is a smoothing factor constant) and modifies $D_{xy}$ in the depth map to be the lesser of either: (a) $D_c+T_{xy}$, where $D_c$ is relative depth of the current region; or (b) relative depth of the pixel $P_{xy}$'s own region. In the illustrative embodiments, K=0.02. In that manner, the conversion device 110 gradually increases $D_{xy}$ (beyond $D_c$) as the pixel $P_{xy}$'s respective distance $N_{xy}$ increases away from the current region, so long as $D_{xy}$ stays less than or equal to relative depth of the pixel $P_{xy}$'s own region. Accordingly, the conversion device 110 selectively adjusts the pixel $P_{xy}$'s respective depth $D_{xy}$ in the depth map, so that $D_{xy}$: (a) approaches $D_c$ as the pixel $P_{xy}$'s respective distance $N_{xy}$ decreases; and (b) approaches relative depth of the pixel $P_{xy}$'s own region as the pixel $P_{xy}$'s respective distance $N_{xy}$ increases.

At a next step 706, the conversion device 110 determines whether the current region is the next-to-deepest region within the 2D image. If the current region is not the next-to-deepest region within the 2D image (e.g., if the current region is the foreground region, or is a background region whose relative depth is 0.2, 0.4 or 0.6, in the 6-region example discussed hereinabove), then operation continues from the step 706 to a step 708. At the step 708, the conversion device 110 designates the next deepest region as the current region, and operation returns to the step 704. Accordingly, in the 6-region example discussed hereinabove, if the current region is the foreground region (whose relative depth=0.0), then the conversion device 110 (at the step 708) designates the next deepest region (e.g., the background region whose relative depth=0.2 in the 6-region example discussed hereinabove) as the current region before operation returns to the step 704. By comparison, referring again to the step 706, if the current region is the next-to-deepest region within the 2D image (e.g., if the current region is the background region whose relative depth=0.8 in the 6-region example discussed hereinabove), then operations of FIG. 7 end.

Figure 8:
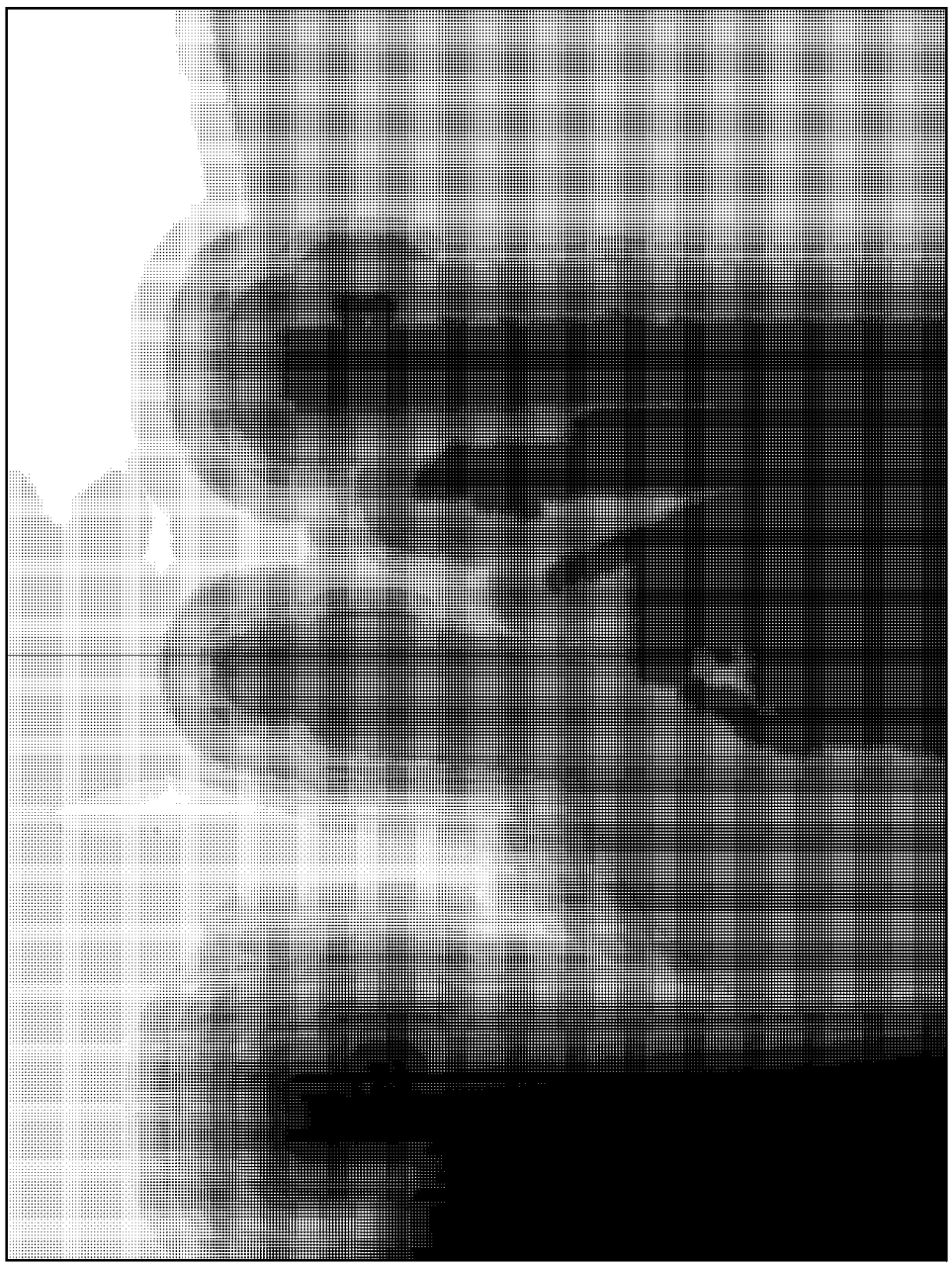
FIG. 8 is an example of a depth map, in a first embodiment, after the depth transition smoothing operations of FIG. 7 for the 2D image of FIG. 3.

FIG. 8 shows an example of the depth map, in the first embodiment, after the depth transition smoothing operations of FIG. 7 for the 2D image of FIG. 3. For efficiency in the first embodiment, the conversion device 110 conducts a fast marching operation to perform all computations of the step 208 (including the depth transition smoothing operations of FIG. 7) in a single pass through the depth map. Accordingly, at the step 208, in the single pass through the depth map: (a) the conversion device 110 computes the respective distances $N_{xy}$ of all background pixels; and (b) in response to the respective distances $N_{xy}$, the conversion device 110 selectively adjusts respective depths $D_{xy}$ of background pixels in the depth map, so that the respective depths $D_{xy}$ are variable. After the step 208, operation continues to the steps 210 and 212 in parallel with one another.

Figure 9:
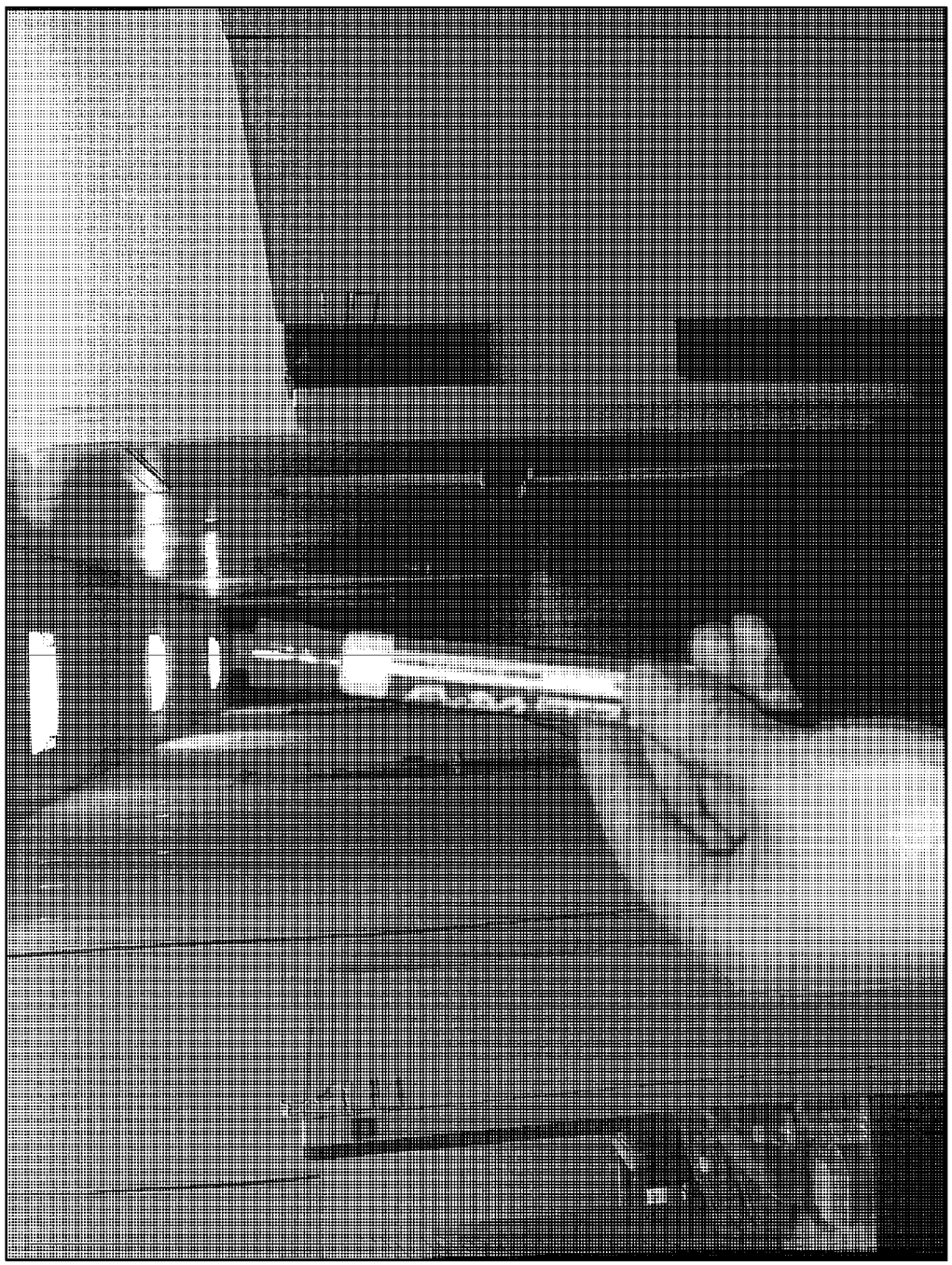
FIG. 9 is an example of a left view of a 3D image that corresponds to the 2D image of FIG. 3, as synthesized in the first embodiment.

FIG. 9 is an example of a left view of a 3D image that corresponds to the 2D image of FIG. 3, as synthesized by the conversion device 110 at the step 210 (FIG. 2) in the first embodiment. At the step 210 in the first embodiment, the conversion device 110 synthesizes the left view of the 2D image's corresponding 3D image by: (a) for the deepest pixels, which have a relative depth=1.0, keeping such pixels at their existing X-Y coordinate locations; and (b) for other pixels, which have a relative depth<1.0, moving such pixels in a right direction by increasing their respective column Y locations, in response to (e.g., in inverse proportion to) their respective depths $D_{xy}$ in the depth map. For example, in synthesizing the left view of a pixel $P_{xy}$ having a respective depth $D_{xy}$ in the depth map, the conversion device 110 moves such pixel $P_{xy}$ in a right direction by an integer number Shift$_{xy}$ of pixels (so that such pixel $P_{xy}$'s respective column Y location increases to a variable extent, which is inversely proportional to $D_{xy}$), where: (a) Shift$_{xy}$=J·(1.0–$D_{xy}$), rounded to the nearest integer; and (b) J is a stereoscopic conversion constant.

Often, the foreground region includes an object of interest (e.g., a hand that holds a whiteboard marker in the example of FIG. 9). Accordingly, in synthesizing the left view at the step 210, the conversion device 110 moves all pixels within the foreground region ("foreground pixels") in a right direction by the same amount as one another, because all foreground pixels continue having a fixed relative depth=0 in the depth map (even after the step 208, which includes the depth transition smoothing operations of FIG. 7). In that manner, the conversion device 110 keeps the foreground region intact (e.g., the hand that holds the whiteboard marker in the example of FIG. 9), so that all foreground pixels remain in their same positions relative to one another. By keeping the foreground region intact, the conversion device 110 protects the foreground region against geometric distortion in the 3D image. Similarly, in synthesizing a right view of the 2D image's corresponding 3D image at the step 212, the conversion device 110 moves all foreground pixels in a left direction by the same amount as one another.

Accordingly, at the step 212 in the first embodiment, the conversion device 110 synthesizes the right view by: (a) for the deepest pixels, which have a relative depth=1.0, keeping such pixels at their existing X-Y coordinate locations; and (b) for other pixels, which have a relative depth<1.0, moving such pixels in a left direction by decreasing their respective column Y locations, in response to (e.g., in inverse proportion to) their respective depths $D_{xy}$ in the depth map. For example, in synthesizing the right view of a pixel $P_{xy}$ having a respective depth $D_{xy}$ in the depth map, the conversion device 110 moves such pixel $P_{xy}$ in a left direction by the integer number Shift$_{xy}$ of pixels (so that such pixel $P_{xy}$'s respective column Y location decreases to a variable extent, which is inversely proportional to $D_{xy}$). Accordingly, the conversion device 110 performs a depth-based image rendering ("DBIR") operation that generates a stereoscopic pair of views, namely the left view (step 210) and the right view (step 212), which converts the 2D image into its corresponding 3D image.

Figure 10:
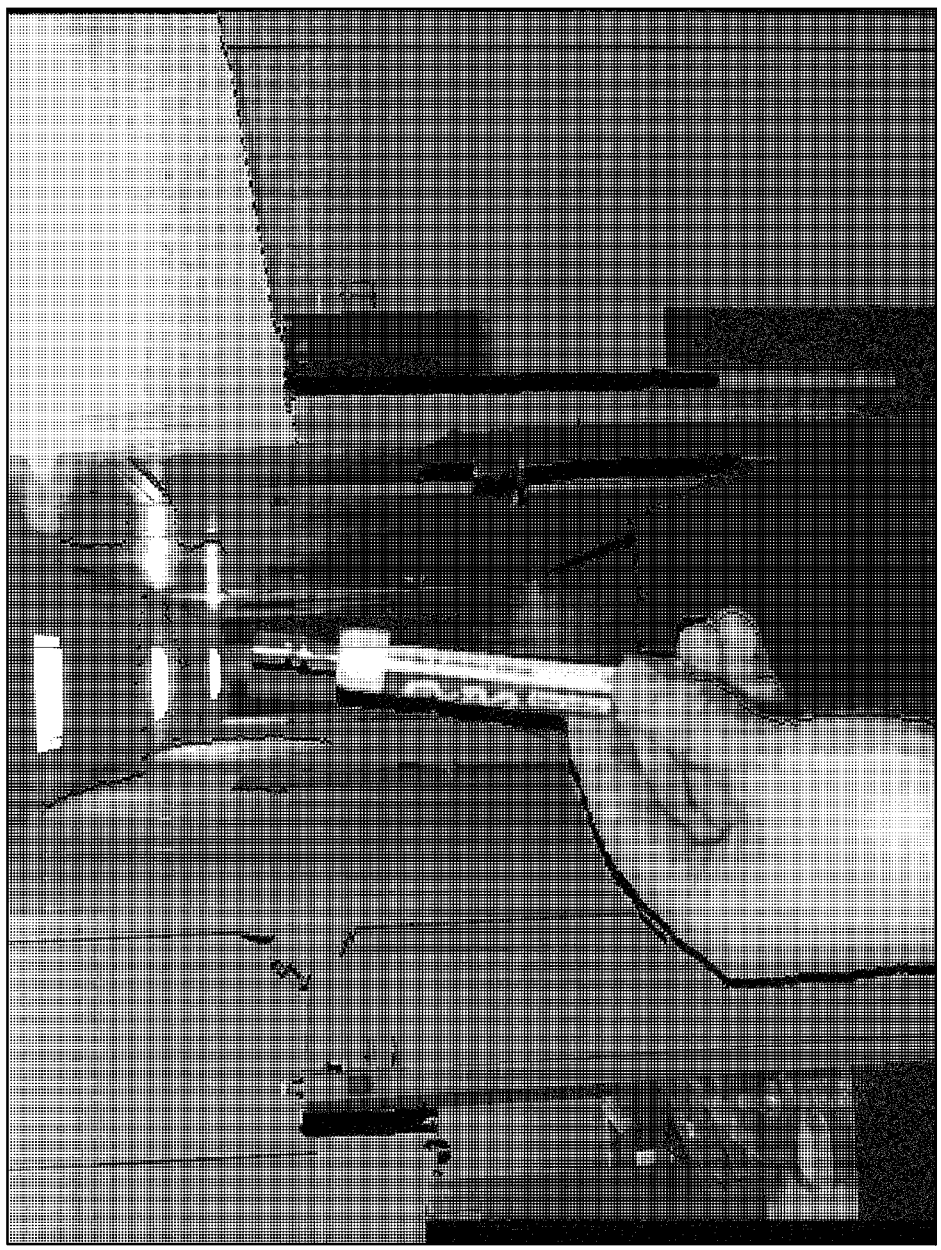
FIG. 10 is an example of a left view of a 3D image that corresponds to the 2D image of FIG. 3, as synthesized without the depth transition smoothing operations of FIG. 7.

By performing the step 208 (including the depth transition smoothing operations of FIG. 7), the conversion device 110 removes holes that would have otherwise appeared in the left view (step 210). Examples of such holes in the left view are shown in FIG. 10, resulting from larger differences in depth values (e.g., as shown in the depth map of FIG. 4) alongside boundaries between neighboring regions within the 2D image. In the first embodiment, the conversion device 110 reduces such differences in depth values alongside such boundaries, so that: (a) on a left side of the left view's foreground region, the conversion device 110 moves certain background pixels to fill such holes, in a manner that stretches the foreground region's adjacent background region(s); and (b) on a right side of the left view's foreground region, the conversion device 110 moves certain background pixels, in a manner that squeezes the foreground region's adjacent background region(s).

Figure 11:
FIG. 11 is an example of a right view of a 3D image that corresponds to the 2D image of FIG. 3, as synthesized without the depth transition smoothing operations of FIG. 7.

Similarly, by performing the step 208 (including the depth transition smoothing operations of FIG. 7), the conversion device 110 removes holes that would have otherwise appeared in the right view (step 212). Examples of such holes in the right view are shown in FIG. 11, resulting from larger differences in depth values (e.g., as shown in the depth map of FIG. 4) alongside boundaries between neighboring regions within the 2D image. In the first embodiment, the conversion device 110 reduces such differences in depth values alongside such boundaries, so that: (a) on a right side of the right view's foreground region, the conversion device 110 moves certain background pixels to fill such holes, in a manner that stretches the foreground region's adjacent background region(s); and (b) on a left side of the right view's foreground region, the conversion device 110 moves certain background pixels, in a manner that squeezes the foreground region's adjacent background region(s).

After the steps 210 and 212, operation continues to a step 214. At the step 214, the conversion device 110 writes the 3D image for storage into the storage device 108. At a next step 216, the conversion device 110 determines whether a next 2D image (e.g., within a video sequence of digitized pictures) remains to be converted into its corresponding 3D image. If the conversion device 110 determines that a next 2D image remains to be converted into its corresponding 3D image, then operation returns to the step 202 for such next 2D image. Conversely, if the conversion device 110 determines that no 2D image remains to be converted into its corresponding 3D image, then operations of FIG. 2 end.

In a second embodiment, at the step 208, for each background pixel $P_{xy}$, the conversion device 110 computes two respective distances $N_{xy}$, namely: (a) a first respective distance $leftN_{xy}$ from the pixel $P_{xy}$ to its nearest left boundary pixel ("$P_{xy}$'s nearest left boundary pixel") that is located within a shallower region ("$P_{xy}$'s nearest left shallower region"), so that the pixel $P_{xy}$'s nearest left shallower region is shallower than the pixel $P_{xy}$'s own region, and so that a respective column Y location of the pixel $P_{xy}$'s nearest left boundary pixel is left of (smaller than) a respective column Y location of the pixel $P_{xy}$; and (b) a second respective distance $rightN_{xy}$ from the pixel $P_{xy}$ to its nearest right boundary pixel ("$P_{xy}$'s nearest right boundary pixel") that is located within a shallower region ("$P_{xy}$'s nearest right shallower region"), so that the pixel $P_{xy}$'s nearest right shallower region is shallower than the pixel $P_{xy}$'s own region, and so that a respective column Y location of the pixel $P_{xy}$'s nearest right boundary pixel is right of (greater than) a respective column Y location of the pixel $P_{xy}$.

In the example of FIG. 6, the pixel $P_{03}$ is: (a) two pixels (e.g., $P_{02}$ and $P_{01}$) away from its nearest left boundary pixel $P_{01}$, so that the pixel $P_{03}$'s respective distance $leftN_{03}=2$, and so that the first region is the pixel $P_{03}$'s nearest left shallower region; and (b) ~3.61 pixels away from its nearest right boundary pixel $P_{35}$, so that the pixel $P_{03}$'s respective distance $rightN_{03}=~3.61$, and so that the second region is the pixel $P_{03}$'s nearest right shallower region. By comparison, the pixel $P_{14}$ is: (a) ~3.16 pixels away from its nearest left boundary pixel $P_{01}$, so that the pixel $P_{14}$'s respective distance $leftN_{14}=~3.16$, and so that the first region is the pixel $P_{14}$'s nearest left shallower region; and (b) ~2.24 pixels away from its nearest right boundary pixel $P_{35}$, so that the pixel $P_m$'s respective distance $rightN_{14}=~2.24$, and so that the second region is the pixel $P_{14}$'s nearest right shallower region. Similarly, the pixel $P_{32}$ is: (a) one pixel (e.g., $P_{31}$) away from its nearest left boundary pixel $P_{31}$, so that the pixel $P_{32}$'s respective distance $leftN_{32}=1$, and so that the first region is the pixel $P_{32}$'s nearest left shallower region; and (b) ~2.24 pixels (e.g., $\sqrt{[2^2+1^2]}$) away from its nearest right boundary pixel $P_{44}$, so that the pixel $P_{32}$'s respective distance $rightN_{32}=~2.24$, and so that the second region is the pixel $P_{32}$'s nearest right shallower region.

In the second embodiment, at the step 704, the conversion device 110 generates two copies of the depth map, namely: (a) a first copy, which is a left view depth map; and (b) a second copy, which is a right view depth map. After generating such copies: (a) in response to the respective distances $leftN_{xy}$, the conversion device 110 selectively adjusts respective depths (in the left view depth map) of background pixels (in regions deeper than the current region) whose nearest shallower region is the current region; and (b) similarly, in response to the respective distances $rightN_{xy}$, the conversion device 110 selectively adjusts respective depths (in the right view depth map) of background pixels (in regions deeper than the current region) whose nearest shallower region is the current region.

For such adjustment of a pixel $P_{xy}$'s respective depth $D_{xy}$ in the left view depth map, the conversion device 110 computes a transition amount $leftT_{xy}=K \cdot leftN_{xy}$, and modifies $D_{xy}$ in the left view depth map to be the lesser of either: (a) $D_c+leftT_{xy}$, where $D_c$ is relative depth of the current region; or (b) relative depth of the pixel $P_{xy}$'s own region. In that manner, the conversion device 110 gradually increases $D_{xy}$ (beyond relative depth of the current region) as the pixel $P_{xy}$'s respective distance $leftN_{xy}$ increases away from the current region, so long as $D_{xy}$ stays less than or equal to relative depth of the pixel $P_{xy}$'s own region. Accordingly, the conversion device 110 selectively adjusts the pixel $P_{xy}$'s respective depth $D_{xy}$ in the left view depth map, so that $D_{xy}$: (a) approaches $D_c$ as the pixel $P_{xy}$'s respective distance $leftN_{xy}$ decreases; and (b) approaches relative depth of the pixel $P_{xy}$'s own region as the pixel $P_{xy}$'s respective distance $leftN_{xy}$ increases.

Similarly, for such adjustment of a pixel $P_{xy}$'s respective depth $D_{xy}$ in the right view depth map, the conversion device 110 computes a transition amount $rightT_{xy}=K \cdot rightN_{xy}$, and modifies $D_{xy}$ in the right view depth map to be the lesser of either: (a) $D_c+rightT_{xy}$, where $D_c$ is relative depth of the current region; or (b) relative depth of the pixel $P_{xy}$'s own region. In that manner, the conversion device 110 gradually increases $D_{xy}$ (beyond relative depth of the current region) as the pixel $P_{xy}$'s respective distance $rightN_{xy}$ increases away from the current region, so long as $D_{xy}$ stays less than or equal to relative depth of the pixel $P_{xy}$'s own region. Accordingly, the conversion device 110 selectively adjusts the pixel $P_{xy}$'s respective depth $D_{xy}$ in the right view depth map, so that $D_{xy}$: (a) approaches $D_c$ as the pixel $P_{xy}$'s respective distance $rightN_{xy}$ decreases; and (b) approaches relative depth of the pixel $P_{xy}$'s own region as the pixel $P_{xy}$'s respective distance $rightN_{xy}$ increases.

Figure 12:
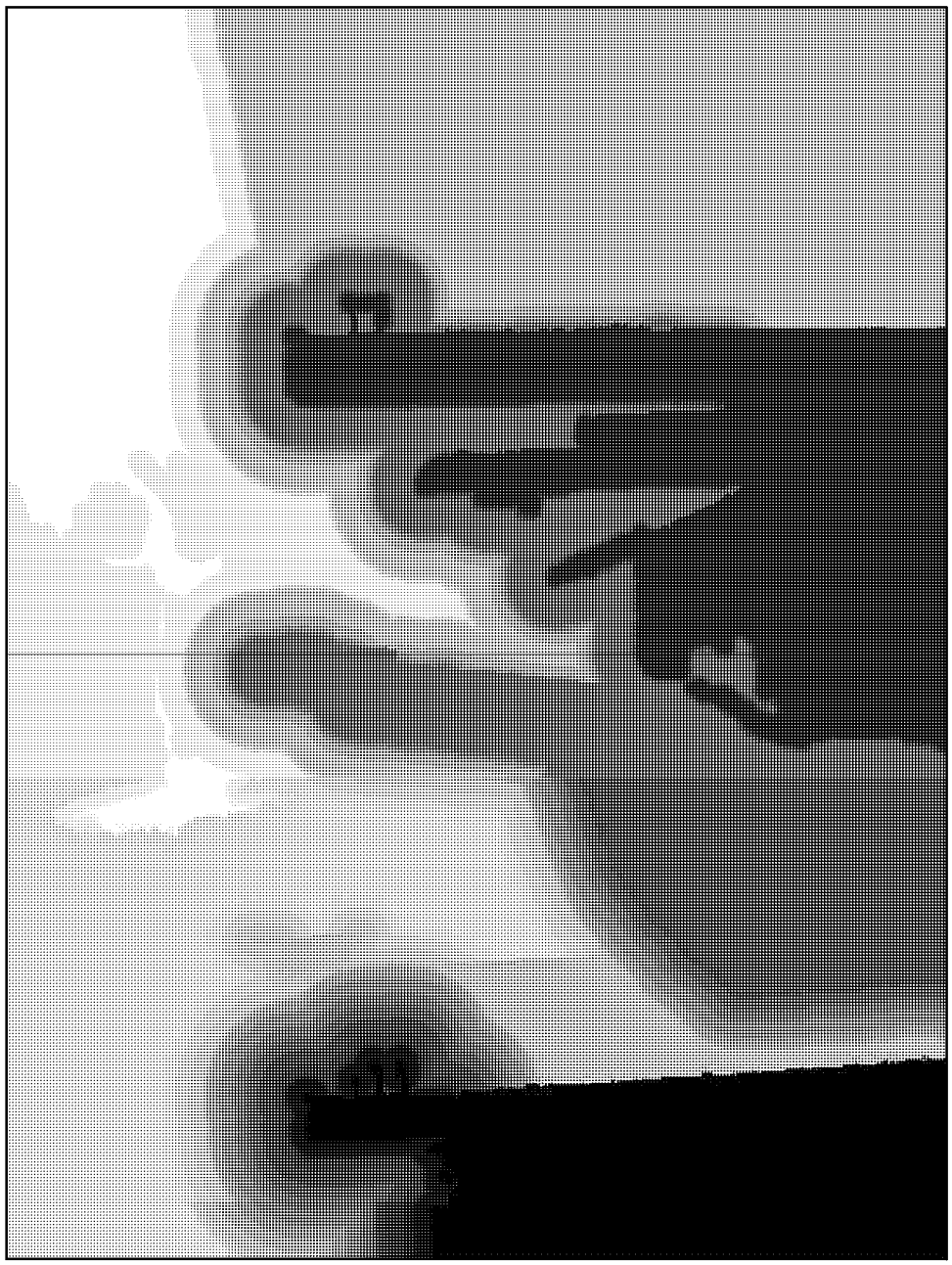
FIG. 12 is an example of a left view depth map, in a second embodiment, after the depth transition smoothing operations of FIG. 7 for the 2D image of FIG. 3.
Figure 13:
FIG. 13 is an example of a right view depth map, in the second embodiment, after the depth transition smoothing operations of FIG. 7 for the 2D image of FIG. 3.

FIG. 12 shows an example of the left view depth map, in the second embodiment, after the depth transition smoothing operations of FIG. 7 for the 2D image of FIG. 3. FIG. 13 shows an example of the right view depth map, in the second embodiment, after the depth transition smoothing operations of FIG. 7 for the 2D image of FIG. 3. For efficiency in the second embodiment, the conversion device 110 conducts a fast marching operation to perform all computations of the step 208 (including the depth transition smoothing operations of FIG. 7) in a single pass through the left view depth map, and in a single pass through the right view depth map. Accordingly, at the step 208, in the single pass through the left view depth map: (a) the conversion device 110 computes the respective distances $leftN_{xy}$ of all background pixels; and (b) in response to the respective distances $leftN_{xy}$, the conversion device 110 selectively adjusts respective depths $D_{xy}$ of background pixels in the left view depth map, so that the respective depths $D_{xy}$ are variable. Similarly, at the step 208, in the single pass through the right view depth map: (a) the conversion device 110 computes the respective distances $rightN_{xy}$ of all background pixels; and (b) in response to the respective distances $rightN_{xy}$, the conversion device 110 selectively adjusts respective depths $D_{xy}$ of background pixels in the right view depth map, so that the respective depths $D_{xy}$ are variable.

Figure 14:
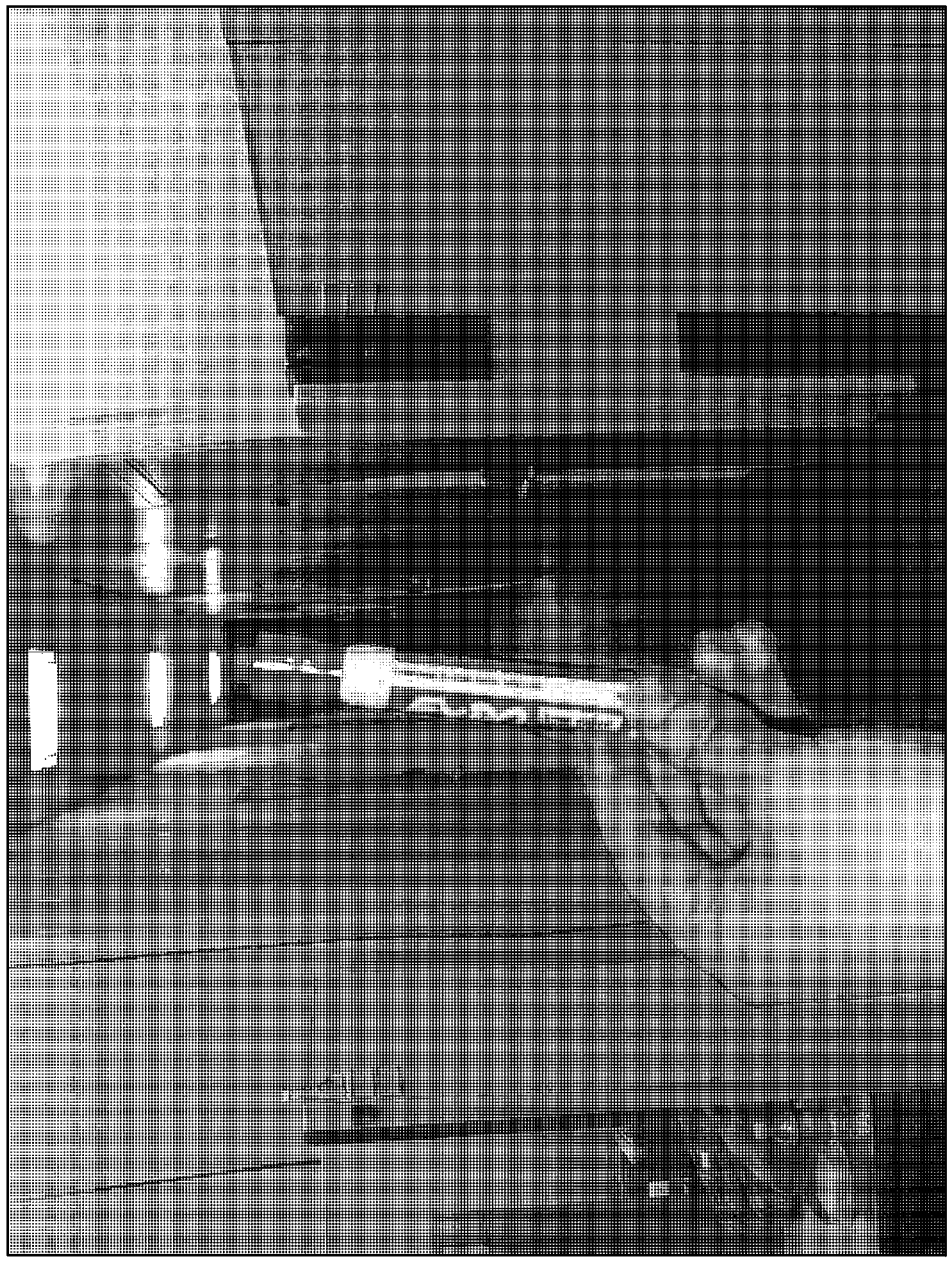
FIG. 14 is an example of a left view of a 3D image that corresponds to the 2D image of FIG. 3, as synthesized in the second embodiment.

FIG. 14 is an example of the left view of a 3D image that corresponds to the 2D image of FIG. 3, as synthesized by the conversion device 110 at the step 210 (FIG. 2) in the second embodiment. At the step 210 in the second embodiment, the conversion device 110 synthesizes the left view of the 3D image by: (a) for the deepest pixels, which have a relative depth=1.0, keeping such pixels at their existing X-Y coordinate locations; and (b) for other pixels, which have a relative depth<1.0, moving such pixels in a right direction by increasing their respective column Y locations, in response to (e.g., in inverse proportion to) their respective depths $D_{xy}$ in the left view depth map. For example, in synthesizing the left view of a pixel $P_{xy}$ having a respective depth $D_{xy}$ in the left view depth map, the conversion device 110 moves such pixel $P_{xy}$ in a right direction by an integer number $RightShift_{xy}$ of pixels (so that such pixel $P_{xy}$'s respective column Y location increases to a variable extent, which is inversely proportional to $D_{xy}$), where $RightShift_{xy}=J \cdot (1.0-D_{xy})$, rounded to the nearest integer.

Figure 15:
FIG. 15 is an example of a right view of a 3D image that corresponds to the 2D image of FIG. 3, as synthesized in the second embodiment.

FIG. 15 is an example of the right view of a 3D image that corresponds to the 2D image of FIG. 3, as synthesized by the conversion device 110 at the step 212 (FIG. 2) in the second embodiment. At the step 212 in the second embodiment, the conversion device 110 synthesizes the right view of the 3D image by: (a) for the deepest pixels, which have a relative depth=1.0, keeping such pixels at their existing X-Y coordinate locations; and (b) for other pixels, which have a relative depth<1.0, moving such pixels in a left direction by decreasing their respective column Y locations, in response to (e.g., in inverse proportion to) their respective depths $D_{xy}$ in the right view depth map. For example, in synthesizing the right view of a pixel $P_{xy}$ having a respective depth $D_{xy}$ in the right view depth map, the conversion device 110 moves such pixel $P_{xy}$ in a left direction by an integer number LeftShift$_{xy}$ of pixels (so that such pixel $P_{xy}$'s respective column Y location decreases to a variable extent, which is inversely proportional to $D_{xy}$), where LeftShift$_{xy}$=J·(1.0−$D_{xy}$), rounded to the nearest integer.

Accordingly, the conversion device 110 removes holes that would have otherwise appeared in the left view of the 3D image (step 210). In the second embodiment, the conversion device 110 removes such holes by reducing differences in depth values alongside boundaries between neighboring regions within the 2D image, so that: (a) on a left side of the left view's foreground region, the conversion device 110 moves certain background pixels to fill such holes, in a manner that stretches the foreground region's adjacent background region(s); and (b) on a right side of the left view's foreground region, instead of squeezing the foreground region's adjacent background region(s), the conversion device 110 moves the foreground region to cover portions of such background region(s), in a manner that protects the right side against geometric distortion in such background region(s) of the 3D image. This technique of the second embodiment improves depth perception of the 3D image, because such covered portions remain visible in the right view of the 3D image.

Similarly, the conversion device 110 removes holes that would have otherwise appeared in the right view of the 3D image (step 212). In the second embodiment, the conversion device 110 removes such holes by reducing differences in depth values alongside boundaries between neighboring regions within the 2D image, so that: (a) on a right side of the right view's foreground region, the conversion device 110 moves certain background pixels to fill such holes, in a manner that stretches the foreground region's adjacent background region(s); and (b) on a left side of the right view's foreground region, instead of squeezing the foreground region's adjacent background region(s), the conversion device 110 moves the foreground region to cover portions of such background region(s), in a manner that protects the left side against geometric distortion in such background region(s) of the 3D image. This technique of the second embodiment improves depth perception of the 3D image, because such covered portions remain visible in the left view of the 3D image.

In the illustrative embodiments (e.g., the first and second embodiments), the conversion device 110: (a) performs the step 208 (including the depth transition smoothing operations of FIG. 7) in response to a lower resolution version of the depth map; and (b) after the step 208, upsamples the depth map before performing the steps 210 and 212. In an alternative embodiment, a low pass filter (instead of the step 208) is applied to the lower resolution version of the depth map, but the low pass filter can: (a) introduce more geometric distortions in the foreground region (e.g., an object of interest, such as the hand that holds the whiteboard marker in the example of FIG. 9) and its adjacent background region(s) (e.g., the walls in the example of FIG. 9); and/or (b) introduce geometric distortions that are different (e.g., of opposing nature) from one another in the left and right views, which increases a level of discomfort in a human's viewing of the 3D image. By comparison, the illustrative embodiments protect the foreground region against geometric distortion in the 3D image and confine geometric distortions to the background regions.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++ and Matlab); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method performed by an information handling system for converting a two-dimensional visual image into a three-dimensional visual image, the method comprising:
segmenting the two-dimensional visual image into regions, including a first region having a first initial depth and a second region having a second initial depth and a third region having a third initial depth, wherein the first and second regions are separated by at least one first boundary, and wherein the second and third regions are separated by at least one second boundary;

generating a first depth map that assigns first variable depths to pixels of the second region in response to respective first distances of those pixels from the first boundary, wherein the first boundary is located on a first side of those pixels, so that the first variable depths approach the first initial depth as the respective first distances decrease, and so that the first variable depths approach the second initial depth as the respective first distances increase;

generating a second depth map that assigns second variable depths to the pixels of the second region in response to respective second distances of those pixels from the second boundary, wherein the second boundary is located on a second side of those pixels, so that the second variable depths approach the third initial depth as the respective second distances decrease, and so that the second variable depths approach the second initial depth as the respective second distances increase; and in response to at least one of the first and second depth maps, synthesizing left and right views of the three-dimensional visual image.

2. The method of claim 1, wherein the second initial depth is greater than the first initial depth.

3. The method of claim 2, wherein the first region is a foreground region, and the second region is a background region.

4. The method of claim 3, wherein generating the first depth map includes:
generating the first depth map that assigns the first initial depth to pixels of the foreground region.

5. The method of claim 1, wherein the second initial depth is greater than the first and third initial depths, and wherein the third initial depth is greater than the first initial depth.

6. The method of claim 1, wherein the first side is a left side, and the second side is a right side.

7. The method of claim 1, wherein synthesizing the left and right views includes:
in response to the first depth map, synthesizing the left view; and
in response to the second depth map, synthesizing the right view.

8. The method of claim 7, wherein synthesizing the left and right views includes:
synthesizing the left view by moving the pixels of at least the second region in a right direction to a first variable extent, wherein the first variable extent is inversely proportional to the first depth map's assigned depths of those pixels; and
synthesizing the right view by moving the pixels of at least the second region in a left direction to a second variable extent, wherein the second variable extent is inversely proportional to the second depth map's assigned depths of those pixels.

9. The method of claim 1, and comprising:
outputting the left and right views to a display device for displaying the three-dimensional visual image.

10. A system for converting a two-dimensional visual image into a three-dimensional visual image, the system comprising:
at least one device for: segmenting the two-dimensional visual image into regions, including a first region having a first initial depth and a second region having a second initial depth and a third region having a third initial depth, wherein the first and second regions are separated by at least one first boundary, and wherein the second and third regions are separated by at least one second boundary; generating a first depth map that assigns first variable depths to pixels of the second region in response to respective first distances of those pixels from the first boundary, wherein the first boundary is located on a first side of those pixels, so that the first variable depths approach the first initial depth as the respective first distances decrease, and so that the first variable depths approach the second initial depth as the respective first distances increase; generating a second depth map that assigns second variable depths to the pixels of the second region in response to respective second distances of those pixels from the second boundary, wherein the second boundary is located on a second side of those pixels, so that the second variable depths approach the third initial depth as the respective second distances decrease, and so that the second variable depths approach the second initial depth as the respective second distances increase; ,and, in response to at least one of the first and second depth maps, synthesizing left and right views of the three-dimensional visual image.

11. The system of claim 10, wherein the second initial depth is greater than the first initial depth.

12. The system of claim 11, wherein the first region is a foreground region, and the second region is a background region.

13. The system of claim 12, wherein generating the first depth map includes:
generating the first depth map that assigns the first initial depth to pixels of the foreground region.

14. The system of claim 10, wherein the second initial depth is greater than the first and third initial depths, and wherein the third initial depth is greater than the first initial depth.

15. The system of claim 10, wherein the first side is a left side, and the second side is a right side.

16. The system of claim 10, wherein synthesizing the left and right views includes:
in response to the first depth map, synthesizing the left view; and
in response to the second depth map, synthesizing the right view.

17. The system of claim 16, wherein synthesizing the left and right views includes:
synthesizing the left view by moving the pixels of at least the second region in a right direction to a first variable extent, wherein the first variable extent is inversely proportional to the first depth map's assigned depths of those pixels; and
synthesizing the right view by moving the pixels of at least the second region in a left direction to a second variable extent, wherein the second variable extent is inversely proportional to the second depth map's assigned depths of those pixels.

18. The system of claim 10, wherein the device is for:
outputting the left and right views to a display device for displaying the three-dimensional visual image.

19. A computer program product for converting a two-dimensional visual image into a three-dimensional visual image, the computer program product comprising:
a tangible non-transitory computer-readable storage medium; and
a computer-readable program stored on the tangible non-transitory computer-readable storage medium, wherein the computer-readable program is processable by an information handling system for causing the information handling system to perform operations including: segmenting the two-dimensional visual image into regions, including a first region having a first initial depth and a second region having a second initial depth and a third region having a third initial depth, wherein the first and second regions are separated by at least one first boundary, and wherein the second and third regions are separated by at least one second boundary; generating a first depth map that assigns first variable depths to pixels of the second region in response to respective first distances of those pixels from the first boundary, wherein the first boundary is located on a first side of those pixels, so that the first variable depths approach the first initial depth as the respective first distances decrease, and so that the first variable depths approach the second initial depth as the respective first distances increase; generating a second depth map that assigns second variable depths to the pixels of the second region in response to respective second distances of those pixels from the second boundary, wherein the second boundary is located on a second side of those pixels, so that the second variable depths approach the third initial depth as the respective second distances decrease, and so that the second variable depths approach the second initial depth as the respective second distances increase; and, in response to at least one of the first and second depth maps, synthesizing left and right views of the three-dimensional visual image.

20. The computer program product of claim 19, wherein the second initial depth is greater than the first initial depth.

21. The computer program product of claim 20, wherein the first region is a foreground region, and the second region is a background region.

22. The computer program product of claim 21, wherein generating the first depth map includes:
generating the first depth map that assigns the first initial depth to pixels of the foreground region.

23. The computer program product of claim 19, wherein the second initial depth is greater than the first and third initial depths, and wherein the third initial depth is greater than the first initial depth.

24. The computer program product of claim 19, wherein the first side is a left side, and the second side is a right side.

25. The computer program product of claim 19, wherein synthesizing the left and right views includes:
in response to the first depth map, synthesizing the left view; and
in response to the second depth map, synthesizing the right view.

26. The computer program product of claim 25, wherein synthesizing the left and right views includes:
synthesizing the left view by moving the pixels of at least the second region in a right direction to a first variable extent, wherein the first variable extent is inversely proportional to the first depth map's assigned depths of those pixels; and
synthesizing the right view by moving the pixels of at least the second region in a left direction to a second variable extent, wherein the second variable extent is inversely proportional to the second depth map's assigned depths of those pixels.

27. The computer program product of claim 19, wherein the operations include:
outputting the left and right views to a display device for displaying the three-dimensional visual image.

* * * * *